May 16, 1967 D. W. STEEL 3,320,418
SCANNING MEANS INCLUDING A SCREEN WHICH BLOCKS RADIATION
ACCORDING TO THE PROBABILITY OF ITS ORIGIN
Filed June 1, 1964 3 Sheets-Sheet 2

VARIATION IN PHOTON COUNT VS. ORIGINATING AREA

INVENTOR.
DONALD W. STEEL
BY
Tillbury & Body
ATTORNEYS

INVENTOR.
DONALD W. STEEL
BY
ATTORNEYS

United States Patent Office 3,320,418
Patented May 16, 1967

3,320,418
SCANNING MEANS INCLUDING A SCREEN WHICH BLOCKS RADIATION ACCORDING TO THE PROBABILITY OF ITS ORIGIN
Donald W. Steel, Cleveland Heights, Ohio, assignor to Ohio-Nuclear, Inc., Cleveland, Ohio, a corporation of Ohio
Filed June 1, 1964, Ser. No. 371,675
22 Claims. (Cl. 250—71.5)

This invention relates to the art of radioactivity scanning, and more particularly to an improvement therein whereby greater resolution and definition of the scan readout image is obtained than that by scanning systems known heretofore.

The invention is particularly adapted for providing improved photoscan readouts in the art of radioisotope photoscanning and will be described with particular reference thereto, although it will be appreciated that the invention has broader applications and may be used, for example, to obtain improved resolution and definition of the readout of other scanning systems.

Radioisotope scanning is frequently used in scanning human organs or tissue for the presence of tumors and for other purposes. Radioactive isotopes are administered to the patient and accumulate in the tissue to be examined. A detector scanning head which shields the detector from radioactivity except that admitted through apertures in the collimator is used to scan the tissue area. The detector inside the scanning head responds to those photons from the radioactivity in the tissue which passed through the apertures in the collimator by developing an output signal pulse for each photon striking the crystal and of an amplitude proportional to the energy of the detected photon. Circuit means are provided for counting the number of output pulses and upon a predetermined count, develop a trigger pulse signal for energizing an image recording system. The recording system generally includes a light source which is activated by the trigger pulse signal to expose a photographic film to a light beam for recording of a mark. The light source and the film are relatively movable in proportion to the relative movement between the scanning detector head and the tissue being scanned so that the location of the recorded mark on the film generally represents the location in the tissue from which the detected photon originated. By scanning back and forth, across and along the tissue under consideration, a film recording of marks is obtained from which knowledge is obtained as to the locations of intensity variations in the radioactive field of the tissue examined. If the tissue had been administered with radioisotopes that concentrate in non-tumorous tissue, then the absence of recorded marks indicates the location of a tumor. The converse is true if the tissue had been administered with radioisotopes that concentrate in tumorous tissue.

Heretofore obtaining high resolution and definition of the area under examination has always been a problem. For maximum resolution and definition of the scan readout image obtained by radioisotope scanning, the image should graphically represent the location of the origin within a radioactive field of each detected photon. Thus, for example, during any instant in time the scintillation detector head will be located over a particular minute volume of tissue. Photons originating from this minute volume of radioactive tissue may pass through the collimator and strike the scintillation detector crystal and be counted. However, photons may also strike the scintillation detector crystal which originated not from this minute volume, but from the tissue surrounding this minute volume. The statistical probabilities that photons originating in this minute volume will be detected are greater than for photons originating in the surrounding tissue, and it is necessary for optimum resolution and definition of a scan readout image that the image reflect this statistical probability.

In accordance with this invention a novel screen is provided between recording means and image producing means of a radioisotope scanning system. The screen exhibits a predetermined pattern of readout image producing signal pulse passing and blocking characteristics according to a statistical probability as to the location of origination of detected radioactivity. Accordingly, for each image producing signal pulse an image pattern is recorded on the recording means in accordance with the predetermined pattern.

In accordance with another aspect of the invention, improved resolution of the scan readout image obtained by using the inventive screen is provided by developing an image producing signal for each radioactivity count.

In accordance with a still further aspect of the invention, a method is provided for constructing the inventive screen including forming the screen with a pattern throughout its area according to a predetermined variation of image producing signal pulse passing and blocking characteristics according to a statistical probability as to the location of origination of radioactivity.

In accordance with a still further aspect of the invention, a method of radioisotope scanning is provided wherein an image pattern is recorded in response to each readout image producing signal pulse in accordance with a statistical probability as to the location of the origin of detected radioactivity.

The principal object of this invention is to provide means for improving the resolution of the scan readout image of a radioisotope scanner, which is simple in construction and economical to manufacture.

Another object of the present invention is to provide a screen for greatly improving the resolution and definition of a photoscan readout image and which screen may be easily interposed between an energy radioisotope photoscan image projector and a readout film.

Another object of the invention is to provide a method for obtaining improved resolution and definition of a photoscan readout image.

Another object of the invention is to provide a method for manufacturing the inventive screen, which method may be easily and economically practiced.

These and other objects and advantages of the invention will become apparent from the following description of the preferred embodiments of the invention as read in connection with the accompanying drawings in which.

Figure 1:
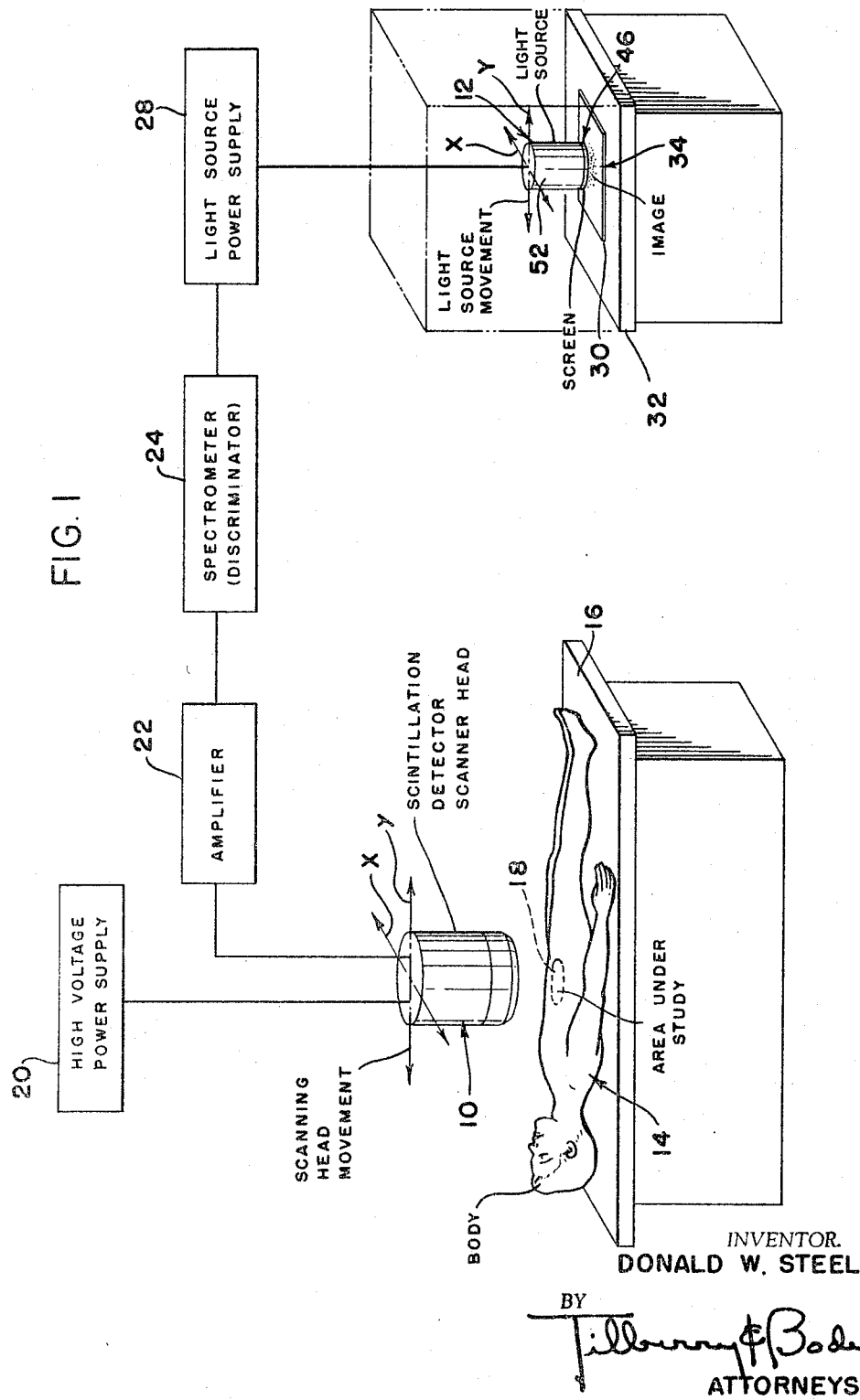
FIGURE 1 is a perspective view illustrating a radioisotope photoscanning apparatus utilizing one embodiment of the inventive screen according to the present invention.
Figure 2:
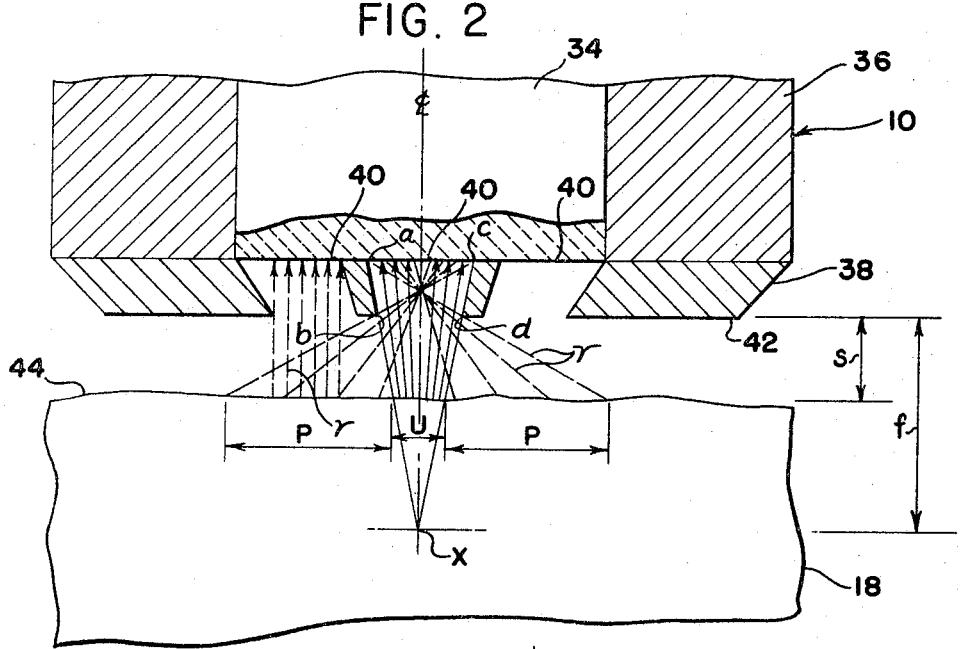
FIGURE 2 is an enlarged cross sectional elevational view illustrating the paths taken by photons emitted from a radioactive field and location of photon origination.
Figure 4:
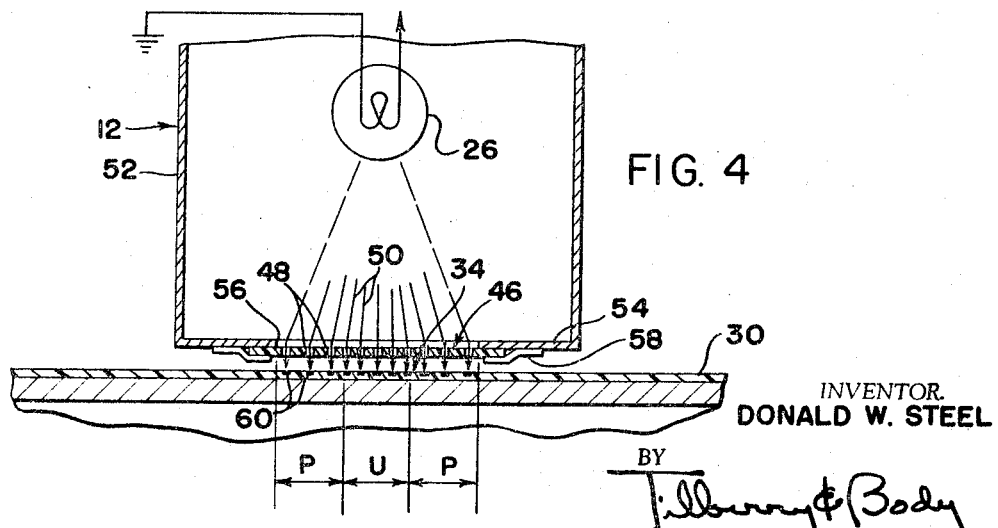
FIGURE 4 is an enlarged cross sectional elevational view illustrating one embodiment of the invention.

Referring now to the drawings, and more particularly to FIGURES 1, 2 and 4, there is illustrated a radioisotope photoscanning apparatus including a scintillation detector scanning head 10 which is operative to scan back and forth and along the length of an object under examination and a photoscan readout projector 12 which is operative to follow synchronously the scanning movement of the detector scanning head 10. In operation, a human being 14 having had his liver 18, or other organ to be examined, previously administered with a suitable radioisotope will lie on a table 16. As the scanning head 10 scans along X and Y axes in a horizontal plane, as illustrated by the arrows in FIGURE 1, and vertically above the liver 18, scintillation crystal and detector means within the head powered by a high voltage power supply 20, are operative to provide an output pulse each time a photon passes through a collimator and strikes the crystal and of a magnitude proportional to the energy of the detected photon. The output pulse is then amplified by means of an amplifier 22 and the amplified signal is received by a spectrometer (discriminator) 24 which serves to discriminate between low voltage signals representative of low energy photons striking the scintillation crystal and high voltage signals and is operative to pass only those signals representative of the energy of the photons of the radioisotope being used. If desired, means may also be provided with a preset counter to count the number of signals passed by the spectrometer and upon a predetermined count, such as 10, be operative to develop an output firing pulse. Preferably, however, in accordance with the present invention, the spectrometer (discriminator) 24 is operative to develop a firing pulse signal for each signal which passes the spectrometer (discriminator). Each firing pulse signal developed by the spectrometer (discriminator) 24 serves to energize a light source 26 of the scan readout projector 12 (see FIGURE 4) via a light source power supply 28. The light source 26 is capable of providing light pulses at a frequency in the order of 1,000 light pulses per second, or more, and, for example, may take the form of a glow modulator tube manufactured by the Sylvania Electric Products, Incorporated and known as Tube R–1131–C. Each time the light source 26 of projector 12 is energized a readout film 30, positioned on light-tight scan readout table 32 and immediately below the projector 12, is exposed to the light pulse. Accordingly, a mark or plurality of marks in accordance with the present invention, is provided on the film and upon completion of the scanning, an image 34 is recorded on the film 30 representative of the intensity levels of radioactivity in the organ being examined.

Turning now to FIGURE 2, there is illustrated a cross sectional view of a portion of the collimator of the scintillation detector scanning head 10, as well as a portion of the liver 18 under examination. For purposes of explanation, the drawing of FIGURE 2 is not drawn to scale. The liver 18 in accordance with standard procedures in radioisotope photoscanning, has been administered with radioisotopes which concentrate in nontumorous tissues. The scintillation detector scanner head 10 includes a scintillation crystal 34, such as sodium iodide (thallium activated) crystal, which is three inches in diameter and surrounded with two inches of lead shielding 36. A collimator 38 is secured to the bottom edge of the shielding 36 and is provided with a plurality of apertures 40 which extend from the crystal 34 through the bottom face 42 of the collimator 38. The apertures 40 are conically tapered to focus at a point X which is at a distance $f$ from the face 42 of the collimator 38. Whereas only three apertures 40 appear in the cross sectional view illustrated in FIGURE 2, there are actually seven apertures, i.e., one being a central aperture with six surrounding apertures. It is common in the field of radioisotope photoscanning to provide a collimator with either a single aperture in the collimator which may be either a straight bore, or tapered to focus at a point X, or a plurality of apertures such as seven apertures as illustrated in FIGURE 2, or nineteen apertures, or thirty-seven apertures, or sixty-one apertures, or ninety-one apertures, etc. The present invention accordingly is not limited to the number of apertures in a collimator or their shape or taper.

Figure 3:
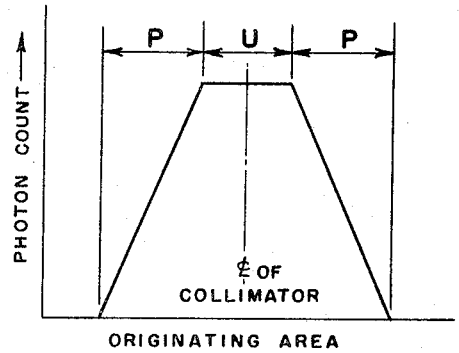
FIGURE 3 is a graphic representation of photon count versus location of origin of photons.

In practice a radioisotope photoscanning head is positioned as close as practical to the organ under examination. Thus, for example, at a given moment in time the focus point X of the apertures of collimator 38 in FIGURE 2 may be located a distance $f$ equal to three inches from the face 42 of the collimator and within the body of the liver 18. The radioactivity in the liver tissues is not a point source, but a field and, hence, there will exist on the upper irregular surface of the tissue a minute area known as the umbra U, which may be defined with reference to the irregular upper surface 44 of the liver as the area existing between straight lines extending through points $a$ and $b$ and points $c$ and $d$ on the collimator 38 to the surface 44. Surrounding the umbra U there exists another area known as the penumbra P which may be defined with respect to the upper surface 44 as the area extending from the outer boundary of the umbra U to the points at which straight lines drawn through points $c$ and $b$ and points $a$ and $d$ on the collimator touch the surface 44. The foregoing definition of the umbra and penumbra areas has been given with respect to the center aperture 40, it being understood that each aperture 40 of collimator 38 has an umbra and penumbra associated therewith which is defined in the same manner as described above. The straight dotted lines labeled $\gamma$ extending from the liver 18 through the collimator apertures 40 and striking the lower surface of crystal 34 represent the paths taken by gamma ray photons from the radioactive tissue. As is apparent, the statistical probability of photons which originate from the umbra U striking the crystal 34 is greater than those originating from the penumbra P. This statistical probability is represented in the graph shown in FIGURE 3, illustrating that the number of photons passing through the apertures in the collimator and striking the crystal 34 from each minute volume under the scanning head varies according to the location of each minute volume relative to the centerline of the collimator, with those photons originating in the umbra U having a greater statistical probability of striking the crystal than those in the penumbra P according to a function of the distance from the centerline. For optimum resolution of a scan readout image it is desirable that the readout image provide information as to the statistical probability of the location of the minute volume of origin of the photons striking the crystal.

In accordance with this invention, each time the light source 26 in the photoscan readout projector 12 is energized, preferably once for each photon detected, an image pattern is recorded which represents the statistical probability that detected photons originated from one minute volume compared to another. This image is obtained by interposing screen 46 between the light source 26 in the scan readout projector 12 and the readout film 30.

Figure 5:
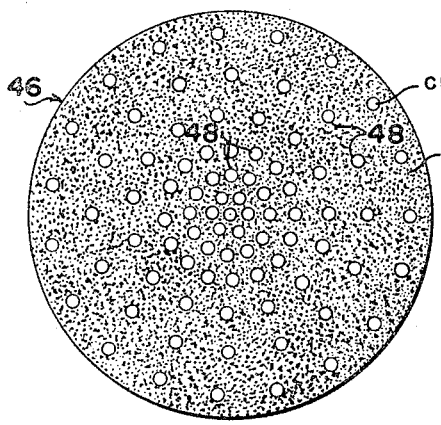
FIGURE 5 is a plan view illustrating the inventive screen shown in FIGURE 4.

Screen 46, illustrated in FIGURE 4 and FIGURE 5, takes the form of a generally flat disc which is opaque for a substantial portion of its surface area. A plurality of transparent areas or dots 48 extend through the thickness of the screen permitting passage of light rays 50 as shown by the arrows in FIGURE 4. The dots 48 are each of the same diameter and small in dimension for maximum resolution, i.e., in the order of 0.001 inch to 0.008 inch, but if desired they may be of different size and shape. The distribution density of the dots 48 per unit area of the screen 46 decreases from the center of the screen radially toward the circumference of the screen in accordance with the statistical probabiilty as to the location of the origin of collimated photons relative to the centerline of the scanning head (see FIGURES 2 and 3). Thus, for example, the screen itself may appear, as shown in FIGURE 5, with the area density of the dots in the umbra area being 5% of the umbra area and the density of the dots in the penumbra approaching 0.5% radially toward the circumference of the screen.

As shown in FIGURE 4, the photoscan projector 12 takes the form of an aluminum tube 52 surrounding the light source 26. A lower plate 54 is suitably secured to the bottom surface of the aluminum tube 52 and is provided with a circular aperture 56, having a diameter corresponding essentially with that of screen 46, i.e., ½ inch to 1 inch. Screen 46 may be of a diameter sufficiently large to slightly overlay the aperture 56 in plate 54. In this manner the peripheral edge of the screen 46 may be secured by suitable means, such as tape 58, to the lower surface of plate 54.

In the operation of the radioisotope photoscanning apparatus illustrated in FIGURE 1, utilizing the inventive screen 46 an output pulse will be developed by the scintillation scanner detector head 10 each time a photon strikes the crystal 34. The output pulse is then amplified by means of amplifier 22 and the amplified signal is received by the spectrometer (discriminator) 24. As described hereinbefore, the spectrometer (discriminator) 24 serves to detect whether the voltage level of the received signal is above a predetermined level indicative of photon energy of the radioisotope being used. If the voltage level is sufficiently high then the spectrometer (discriminator) will develop an output trigger pulse which serves to energize the light source 26 through the light source power supply 28. Preferably, in accordance with this invention, for maximum readout resolution, the light source 26 is energized for each pulse passed by the spectrometer (discriminator) although if desired the light source 26 may be energized after each predetermined number of such pulses. Upon energization of light source 26, light rays 50 emanating from source 26 will pass through the transparent dots 48 in the screen 46 exposing photographic film 30. Accordingly, a plurality of marks 60 are recorded on film 30 equal in number to the number of dots 48 on the screen 46. The distribution density of marks 60 will be the same as that of the dots 48 and will represent the statistical probability as to the location of the origin of the collimated photons which produced the pulse passed by the spectrometer relative to the centerline of the collimator. Since each photon passed by the spectrometer results in the recording of a large number of marks 60 equal in number to the number of dots 48 on the screen 46, which number may, for example, be in the order of 300 or 1,000, or more statistically correctly distributed dots, the completed photoscan readout image 34 recorded on the film 30 will exhibit optimum resolution including all the statistically correct data obtained by the photoscan apparatus to provide the observer, such as a medical surgeon, with an image of the radioactivity in the tissue being examined.

Whereas the preferred embodiment of the inventive screen 46 takes the form as shown in FIGURES 4 and 5, the invention is not limited to a distribution of dots, but may take other forms which include patterns of light transparency in which the transparency varies according to the statistical probability of the location of origin of collimated photons passed by the spectrometer (discriminator). FIGURES 6, 7, 8 and 9 are illustrative of four additional embodiments of the inventive screen.

Figure 6:
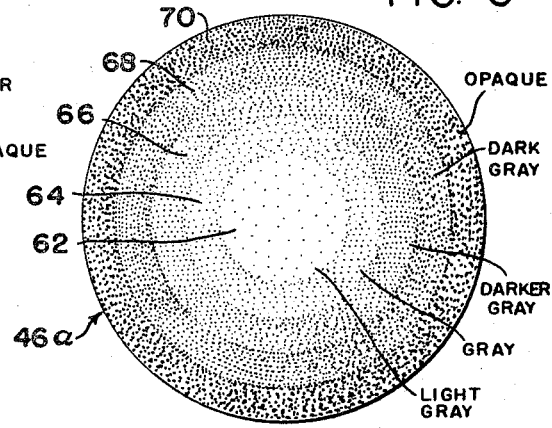
FIGURE 6 is a plan view illustrating a second embodiment of the inventive screen.

In FIGURE 6 there is illustrated a screen 46a which takes the form of a substantially flat disc similar to that illustrated in FIGURE 5. The light transparency and opacity pattern of screen 46a includes a central circular portion 62 shaded an appropriate amount, such as light gray and if desired may be clear transparent. Extending radially outward from the central portion 62 there is provided a plurality of rings 64, 66, 68 and 70 which are of equal width and are progressively shaded darker or less transparent radially toward the circumference of screen 46a. Thus, ring 64 is gray, ring 66 is slightly darker gray, ring 68 is dark gray, and ring 70 is opaque.

Figure 7:
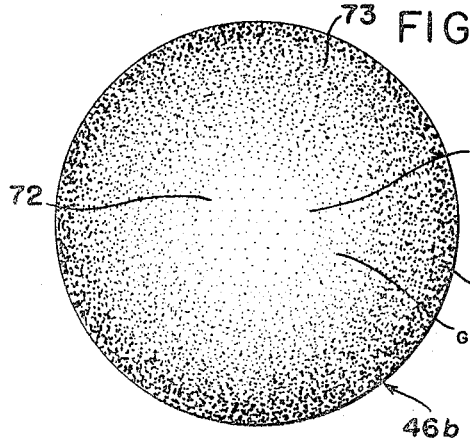
FIGURE 7 is a plan view illustrating a third embodiment of the inventive screen.

Another embodiment of the inventive screen is illustrated in FIGURE 7, wherein screen 46b takes the form of a substantially flat disc similar to that as illustrated in FIGURE 5. Screen 46b is formed having a central circular portion 72 shaded an appropriate amount, such as light gray. Extending radially outward from the central portion 72 is provided an area 73 which is shaded progressively darker radially toward the circumference of the screen 46b approaching opaque in the area adjacent the circumference.

Figure 8:
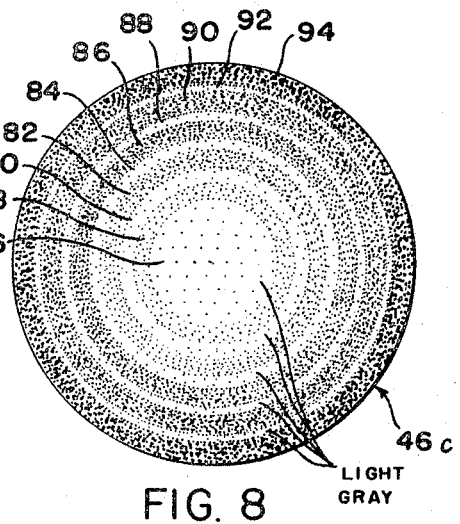
FIGURE 8 is a plan view illustrating a fourth embodiment of the inventive screen.

Similarly, in FIGURE 8, there is illustrated a still further embodiment of the invention in which screen 46c takes the form of a substantially flat disc similar to screen 46 in FIGURE 5. Screen 46c is provided with a varying light transparency pattern wherein a central lightly shaded gray portion 76, which is circular in dimension and progressing radially outward from the central portion 76, there is provided a plurality of alternately opaque and shaded light gray rings 78, 80, 82, 84, 86, 88, 90, 92 and 94. Opaque rings 78, 82, 86, 90 and 94 progressively increase in width with increased radial distance from the central portion 76. Conversely, the shaded rings 80, 84, 88 and 92 progressively decrease in width with increased radial distance from the center portion 76.

Figure 9:
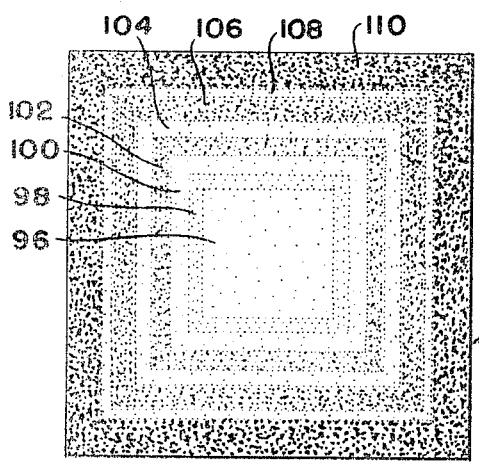
FIGURE 9 is a plan view illustrating a fifth embodiment of the inventive screen.

A still further embodiment of the inventive screen is illustrated in FIGURE 9 wherein screen 46d takes the form of a substantially flat square screen. The screen 46d includes a square central shaded light gray portion 96. Extending outwardly from the central portion 96 there are provided a plurality of surrounding alternately shaded and opaque bands 98, 100, 102, 104, 106, 108 and 110. The opaque bands 98, 102, 106 and 110 progressively increase in width with increased distance from the central portion 96 and conversely the shaded bands 100, 104, 108 progressively decrease in width with increased distance from the central portion 96. The square screen 46d would be utilized with collimators which produce this umbra and penumbra shape. The user may find it convenient to substitute a square aperture in the lower plate 54 of the projector tube 52 for the circular aperture 56.

In constructing screens 46, 46a, 46b, 46c and 46d so that the light transparency and opacity pattern varies in accordance with the statistical probability that a detected photon originated in a particular part of the radioactive field relative to the scanning head, several factors are considered including energy level of radioisotope being used; collimator material; size, taper, dimension location and number of holes in the collimator; the organ or tissue being scanned; as well as the determination of the umbra area U and the penumbra area P (see FIGURE 2). As previously described the umbra area on the irregular surface 42 of liver 18 is determined by the area between lines extending through points $a$ and $b$ and $c$ and $d$ of the collimator 38. The extent of the penumbra P is determined by the area extending outwardly of the umbra area U to a boundary defined by straight lines drawn through points $a$ and $b$ and $c$ and $d$ to the irregular surface 44 of the liver 18. Having determined the various factors, including the extent of the umbra and penumbra areas on the irregular surface 44 of the liver 18, a pattern of dots, shading, gradation, etc., in accordance with FIGURES 5, 6, 7, 8 and 9, there may be displayed an enlarged layout in accordance with the statistical probability as to the location of origin of photons relative to the centerline of the collimator. The layout may then be photographed with a camera to obtain a negative photographic film of reduced size, exhibiting a light transparency and opacity pattern according to the distribution pattern of the layout. For example, to obtain screen 46 illustrated in FIGURE 5, a plurality of black dots in the order of 300 dots of 0.125 inch in diameter were arranged on a white layout in the form of a large circle 15 inches in diameter with the area density of the dots varying from 5% of the central area of the circle to 0.5% of the area adjacent the circumference of the circle. The dot density distribution is made in accordance with the statistical probability as to the location in the radioactive field that the photons originated relative to the centerline of the collimator. The layout is then photographed with a camera so as to reduce the 15 inch diameter layout to approximately 1 inch. The size of the dots would correspondingly be reduced so that they, for example, would be in the order of 0.008 inch in diameter in accordance with the reduction of the 15 inch diameter layout. Thus, a negative photographic film is obtained having a plurality of clear transparent dots arranged thereon of a distribution density in accordance with that of the layout.

Although the present invention has been described with reference to a radioisotope photoscanning system, it is not limited thereto. It is within the contemplation of the invention to utilize the inventive screens with other than photoscanning systems. For example, the transparent areas 48 in the screen 46 may take the form of holes and a plurality of recording needles of a distrubition density in accordance with that of the holes may be substituted for the light source 26. An electromagnetic driving means, for example, may be provided which is responsive to output signal trigger pulses developed by the spectrometer (discriminator) 24 for purposes of driving the needles for recording of a plurality of marks on suitable recording means. Such a recording of marks would take the form of an image pattern according to a statistical probability as to the location of the origination of detected photons within a radioisotope field being scanned.

In the foregoing description and in the appended claims, the term "radioactivity" includes electromagnetic radiation, charged particles and neutrons, i.e., gamma photons, beta particles, alpha particles, neutrons, etc.

The present invention has been described with reference to five particular embodiments of the inventive screen, but is not limited to same. Various modifications may be made without departing from the scope and spirit of the present invention as defined by the appended claims.

What is claimed is:

1. In a radioactivity scanning system for scanning a field of radioactivity including radioactivity detector means for receiving radioactivity from said field and developing output signals in accordance therewith and readout image producing means for developing readout image producing signal pulses in response to said output signals for recording a readout image on recording means in accordance with the intensity levels of said radioactive field, the improvement which comprises screening means interposed between said image producing means and said recording means, said screening means exhibiting a predetermined pattern of readout image producing signal pulse passing and blocking characteristics according to a statistical probability as to the location of the origination of detected radioactivity relative to the location of said detector means, whereby for each image producing signal pulse an image pattern is recorded on said recording means in accordance with said predetermined pattern.

2. In a radioactivity scanning system as set forth in claim 1, wherein said predetermined pattern is characterized by said readout image signal pulse passing and blocking characteristics varying inversely of each other with increased distance from the center of the screening means.

3. In a radioactivity scanning system as set forth in claim 2, wherein said readout image signal pulse passing characteristics decrease with increased distance from the center of said screening means.

4. In a radioisotope photoscanning system for scanning fields of radioactivity including detector means for detecting radioactivity in said fields and developing output signal pulses in accordance therewith and light source means for developing light pulses in response to said output signal pulses for exposing photographic film to said light pulses for recording an image pattern in accordance with the radioactive intensity levels of said fields of radioactivity, the improvement comprising screening means interposed between said light source means and said photographic film, said screening means exhibiting a predetermined pattern of light transparency and opacity in accordance with a statistical probability as to the location of origination of detected radioactivity relative to the location of said detector means, whereby for each said light pulse an image pattern is recorded on said photographic film in accordance with said pattern.

5. In a radioisotope photoscanning system as set forth in claim 4, wherein the opacity of said predetermined pattern progressively increases with increased distance from the center of said screening means.

6. In a radioisotope photoscanning system as set forth in claim 4, wherein said screening means takes the form of a relatively flat disc of negative photographic film having a plurality of spaced marks thereon which are transparent relative to the remaining portion of said film.

7. In a radioisotope photoscanning system as set forth in claim 6, wherein said transparent marks are circular in shape and are all of the same diameter.

8. In a radioisotope photoscanning system as set forth in claim 7, wherein the diameter of each said circular mark is in the order of 0.001 inch to 0.008 inch.

9. In a radioisotope photoscanning system as set forth in claim 6, wherein the distribution density of said transparent marks ranges from approximately 5% of the area in the central portion of said disc to 0.5% of the area of said disc adjacent the circumference thereof.

10. In a radioisotope photoscanning system as set forth in claim 4, wherein said screening means takes the form of a relatively flat disc of negative photographic film of a light transparency and opacity pattern in which the opacity gradually increases with increased radial distance from the center of the disc.

11. In a radioisotope photoscanning system as set forth in claim 4, wherein said screen means takes the form of a relatively flat disc of negative photographic film of a light transparency and opacity pattern including a plurality of concentric ring portions.

12. In a radioisotope photoscanning system as set forth in claim 11, wherein said ring portions are of equal width and are progressively shaded darker from the center of the disc radially toward the circumference thereof.

13. In a radioisotope photoscanning system as set forth in claim 11, wherein said ring portions are alternately shaded light gray and opaque with the width of the light gray ring portions progressively decreasing in width with increased radial distance from the center thereof, and with the opaque ring portions progressively increasing in width with increased radial distance from the center thereof.

14. In a radioisotope photoscanning system as set forth in claim 4, wherein said screening means takes the form of a relatively flat square screen of negative photographic film of a light transparency and opacity pattern including a plurality of alternately shaded light gray and opaque bands of rectangular outline with the light gray bands progressively decreasing in width with increased distance from the center of the screen and with the opaque bands progressively increasing in width with increased distance from the center of the screen.

15. A method including scanning areas of radioactivity with radioactivity detector means for detecting radioactivity, and recording an image pattern on recording means upon a predetermined radioactivity count according to a statistical probability as to the location of origination of detected radioactivity relative to the location of said detector means.

16. A method including scanning areas of radioactivity with a scintillation crystal detector and recording a plurality of marks on recording means upon a predetermined photon count with the distribution density of said marks being in accordance with a statistical probability as to the location of the origination of detected radioactivity relative to the location of said detector means.

17. A method as set forth in claim 16, wherein said plurality of marks are recorded on said recording means for each radioactivity count.

18. A method of constructing a screen adapted to be interposed between image recording means and image producing means of a radioactivity scanning system and comprising forming a screen so as to exhibit a pattern according to a predetermined variation of image producing signal pulse passing and blocking characteristics according to a statistical probability as to the location of origination of detected radioactivity.

19. A method of constructing a screen adapted to be interposed between a light source and a photographic film of a radioisotope photoscanning system and comprising the formation of a screen according to a predetermined pattern of light transparency and opacity according to a statistical probability as to the location of origination of detected radioactivity.

20. A method of constructing a screen adapted to be interposed between a light source and a photographic film of a radioisotope photoscanning system comprising the steps of displaying a pattern on a layout in accordance with a statistical probability as to the location of origination of detected radioactivity, and photographing the pattern on said layout to obtain a negative photographic film exhibiting a light transparency and opacity pattern according to the pattern on said layout.

21. A method of constructing a screen adapted to be interposed between a light source and a photographic film of a radioisotope photoscanning system comprising the steps of displaying a pattern of marks on a layout in accordance with a statistical probability as to the location of origination of detected radioactivity, and photographing the layout in a manner to obtain a negative photographic film exhibiting said pattern of marks reduced proportionately in mark size and spacing between adjacent marks with said marks being transparent relative to the remaining area of said negative photographic film.

22. An article of manufacture for use in a radioisotope photoscanning system for scanning fields of radioactivity having detector means for detecting radioactivity in said fields and developing output signal pulses in accordance therewith and light source means for developing light pulses in response to said output signal pulses for exposing photographic film to said light pulses for recording an image pattern in accordance with the radioactive intensity levels of said fields of radioactivity, said article comprising screening means adapted to be interposed between said light source means and said photographic film, said screening means exhibiting a predetermined pattern of light transparency and opacity in accordance with a statistical probability as to the location of origination of detected radioactivity relative to the location of said detector means, whereby for each said light pulse an image pattern is recorded on said photographic film in accordance with said pattern.

References Cited by the Examiner

"A High-Contrast Photographic-Recorder for Scintillation Counter Scanning"; Kuhl et al.: Radiology, May 1956; pp. 730–739.

"Multichannel Collimators for Gamma-Ray Scanning with Scintillation Counters"; Newell et al.; Nucleonics vol. 10, No. 7, July 1952, pp. 36 to 40.

ARCHIE R. BORCHELT, *Primary Examiner.*

RALPH G. NILSON, *Examiner.*

A. L. BIRCH, *Assistant Examiner.*